(12) United States Patent
Nystrom et al.

(10) Patent No.: US 9,671,009 B2
(45) Date of Patent: Jun. 6, 2017

(54) PRESSURE AND FLOW COMPENSATED HYDRAULIC SYSTEM

(71) Applicant: Deere & Company, Moline, IL (US)

(72) Inventors: Dwayne A. Nystrom, Waterloo, IA (US); Jesse R. Knight, Waterloo, IA (US); Michael A. Holland, Conrad, IA (US)

(73) Assignee: Deere & Company, Moline, IL (US)

( * ) Notice: Subject to any disclaimer, the term of this patent is extended or adjusted under 35 U.S.C. 154(b) by 211 days.

(21) Appl. No.: 14/520,420

(22) Filed: Oct. 22, 2014

(65) Prior Publication Data

US 2016/0116053 A1    Apr. 28, 2016

(51) Int. Cl.

| | |
|---|---|
| *F16H 57/04* | (2010.01) |
| *F04B 49/12* | (2006.01) |
| *B60R 17/02* | (2006.01) |
| *F04B 19/22* | (2006.01) |
| *F16H 61/4139* | (2010.01) |
| *F16H 61/00* | (2006.01) |

(52) U.S. Cl.
CPC ......... *F16H 57/0435* (2013.01); *B60R 17/02* (2013.01); *F04B 19/22* (2013.01); *F04B 49/12* (2013.01); *F16H 57/0404* (2013.01); *F16H 57/0436* (2013.01); *F16H 57/0441* (2013.01); *F16H 61/0031* (2013.01); *F15B 2211/20576* (2013.01); *F16H 61/4139* (2013.01); *F16H 2061/0037* (2013.01)

(58) Field of Classification Search
CPC ............. F16H 57/0435; F16H 57/0436; F16H 57/0404; F04B 49/00; F04B 49/12; F04B 19/22; F04B 41/06

See application file for complete search history.

(56) References Cited

U.S. PATENT DOCUMENTS

| | | |
|---|---|---|
| 5,020,324 A | 6/1991 | MacDonald et al. |
| 9,091,040 B2 * | 7/2015 | Peterson ............... F16H 61/431 |
| 2007/0209982 A1* | 9/2007 | Nystrom ............... F15B 21/041 |
| | | 210/132 |
| 2008/0238187 A1 | 10/2008 | Garnett et al. |

(Continued)

FOREIGN PATENT DOCUMENTS

GB    2014257 A    8/1979

OTHER PUBLICATIONS

European Search Report issued in counterpart application No. 15188068.9 dated Mar. 29, 2016 (6 pages).

*Primary Examiner* — William E Dondero
*Assistant Examiner* — Mark K Buse
(74) *Attorney, Agent, or Firm* — Taft Stettinius & Hollister LLP; Stephen F. Rost

(57) ABSTRACT

A vehicle hydraulic system includes a transmission lube circuit, a variable displacement main pump having an inlet, and a variable displacement charge pump having an outlet and a pressure responsive displacement control unit. The system also includes a charge line communicating the charge pump outlet with the main pump inlet, a sensing line communicating the charge line with the displacement control unit, and a lube line communicating the charge pump outlet with the lube circuit. The lube line includes a fluid restriction. A hydraulic oil filter and a filter bypass valve are connected in parallel between the outlet of the charge pump and the charge line.

14 Claims, 1 Drawing Sheet

(56) References Cited

U.S. PATENT DOCUMENTS

| | | | |
|---|---|---|---|
| 2009/0158727 A1* | 6/2009 | Bitter | F04B 23/10 |
| | | | 60/428 |
| 2010/0097040 A1* | 4/2010 | Boisvert | F15B 7/008 |
| | | | 322/40 |
| 2012/0134848 A1* | 5/2012 | Nelson | E02F 9/226 |
| | | | 417/53 |
| 2012/0152640 A1* | 6/2012 | Mori | B60W 30/18063 |
| | | | 180/307 |
| 2012/0152641 A1* | 6/2012 | Takahashi | F16H 61/431 |
| | | | 180/307 |
| 2013/0000293 A1 | 1/2013 | Dybing | |
| 2013/0047599 A1* | 2/2013 | Opdenbosch | F16D 48/02 |
| | | | 60/464 |
| 2013/0256043 A1* | 10/2013 | Shirao | E02F 9/2253 |
| | | | 180/53.2 |

\* cited by examiner

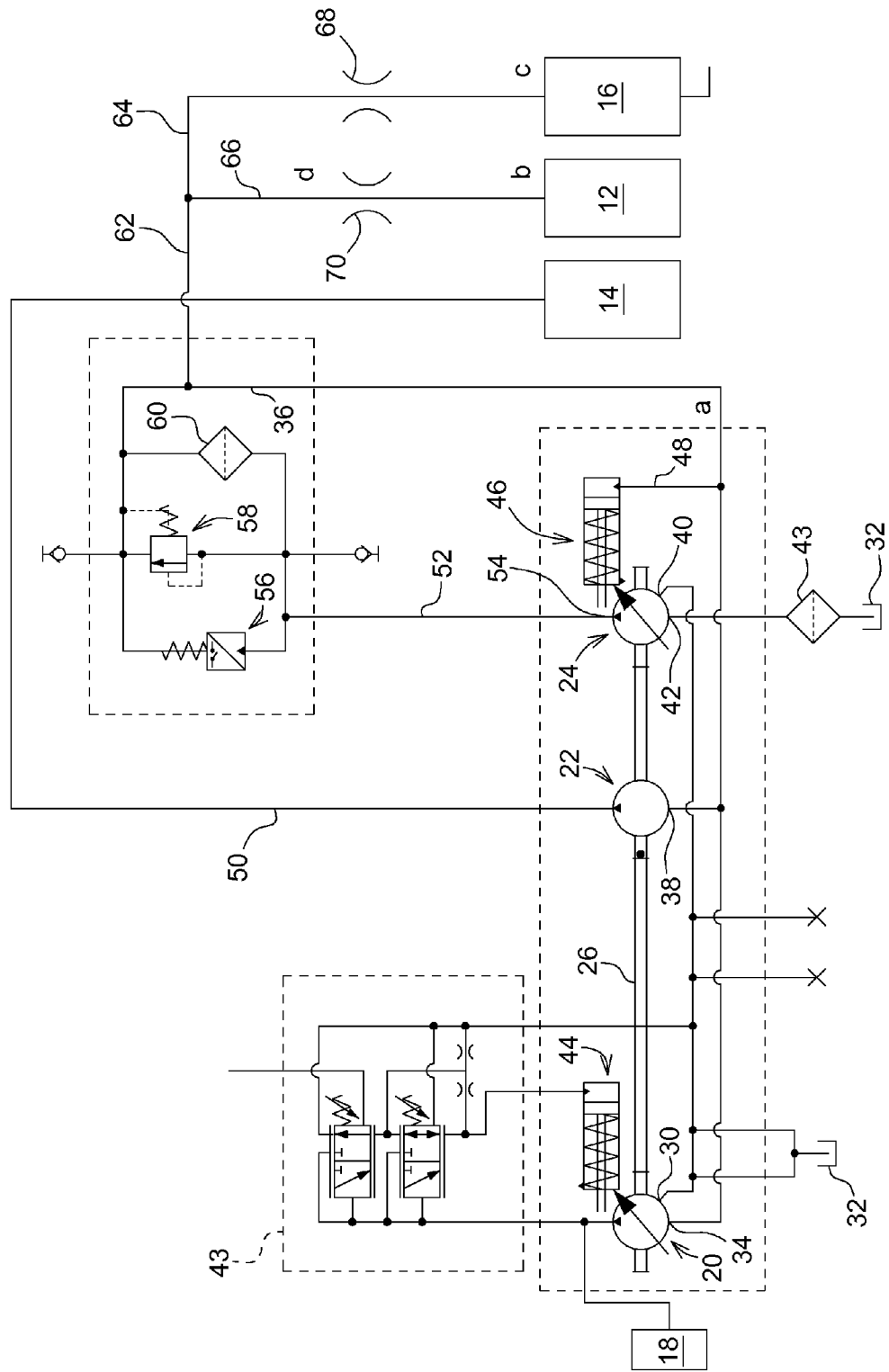

PRESSURE AND FLOW COMPENSATED HYDRAULIC SYSTEM

FIELD

The present disclosure relates to a hydraulic circuit for a vehicle.

BACKGROUND

A known production tractor uses three gear pumps in an open center hydraulic circuit with dedicated pumps for drivetrain lubrication, tractor implement hydraulics, and tractor steering and transmission control hydraulics. Other known production tractors have hydraulic circuits which include dedicated fixed displacement pumps for providing transmission lubrication and charge oil. A John Deere production tractor uses a priority valve to meter oil to the charge and lubrication circuit, but the excess oil must be returned to the sump or pump inlet. On other John Deere production tractors, a variable displacement charge pump provides oil to the inlet of the transmission pumps where the transmission pumps act as flow dividers to split oil to various pressure levels in the transmission lubrication circuit. These latter tractors have hydraulic systems which passively route a small volume of oil to minor lubrication consumers, but these consumers do not control the displacement of the variable displacement charge pump. Another John Deere production tractor has a hydraulic system in which a charge pump fills a clean oil reservoir from which the transmission pump suctions oil from an inlet to the reservoir. These hydraulic circuits require additional pump drives to move the oil to their desired locations which cost the tractor energy due to additional mechanical efficiency losses. Fixed displacement pumps produce excess flow at high engine speeds which must be either pumped through the circuit regardless of demand or bypassed back to tank. Tractor power is wasted when this extra volume of oil is moved without gaining any useful work from it. It is desired to provide a vehicle hydraulic circuit which is able to supply the required charge and lubrication flow with a single variable displacement pump.

SUMMARY

According to an aspect of the present disclosure, a vehicle hydraulic system includes a transmission lube circuit, a variable displacement main pump having an inlet, a fixed displacement transmission control pump, and a variable displacement charge pump for supplying charge fluid to the main pump and transmission control pump inlet. The charge pump has an outlet and a pressure responsive displacement control unit. A charge line communicates the charge pump outlet with the main pump inlet. A sensing line communicates the charge line with the displacement control unit. A lube line communicates the charge pump outlet with the lube circuit. A fluid restriction is formed in the lube line. A hydraulic oil filter is connected between the outlet of the charge pump and the charge line, and a filter bypass valve is also connected between the outlet of the charge pump and the charge line.

The result is a pressure and flow compensated hydraulic circuit for vehicle, such as a tractor. The variable displacement pump supplies charge fluid to a main piston pump and supplies lube fluid to a transmission lube circuit. The proportion of oil flow supplied by the variable displacement charge pump to the transmission lubrication circuit is controlled passively by the fluid restriction. The variable displacement charge pump may supply charge oil to three places, including a high pressure variable displacement piston pump for tractor hydraulics, to a fixed displacement pump for transmission control pressure, and to a transmission lube circuit.

BRIEF DESCRIPTION OF THE DRAWINGS

The sole FIGURE is a schematic circuit diagram of a hydraulic system embodying the invention.

DETAILED DESCRIPTION OF THE DRAWINGS

Referring to FIG. 1, a hydraulic system 10 is provided for a vehicle (not shown), such as an agricultural tractor. The system 10 provides pressurized hydraulic fluid to a conventional transmission lube circuit 12, to a conventional transmission control circuit 14, to a conventional brake circuit 16 and to a conventional implement circuit 18. The system 10 also includes an implement or main pump 20, such as a conventional piston pump, a transmission pump 22, and a variable displacement charge pump 24 (preferably a conventional variable displacement pump). Pumps 20, 22 and 24 may be driven by a common drive shaft 26, which may be driven by an engine (not shown) of the vehicle (not shown).

Main pump 20 has a case drain 30 connected to a reservoir 32 and an inlet 34 connected to charge fluid line 36. Transmission pump 22 has an inlet 38 connected to charge fluid line 36. Charge pump 24 has an outlet 54, a case drain 40 connected to a reservoir 32 and an inlet 42 connected to a reservoir via an inlet screen 43. Main pump 20 has conventional pressure and flow-responsive displacement control device 44. A conventional pump control circuit 43 controls the pressure in the displacement control device 44. Charge pump 24 has a pressure-responsive displacement control device 46. Pressure sensing line 48 communicates control device 46 with the charge fluid line 36.

Line 50 connects an outlet of transmission pump 22 to the transmission control circuit 14. Outlet line 52 is connected to the outlet 54 of charge pump 24. A pressure sensor 56, a filter bypass valve 58 and a hydraulic oil filter 60 are connected in parallel between outlet line 52 and charge fluid line 36. A branch line 62 is connected to charge fluid line 36. A brake valve reservoir supply line 64 connects branch line 62 to the brake circuit 16. A lube line 66 connects branch line 62 to the transmission lube circuit 12. A fluid restriction, such as orifice 68 (passive resistance) or an active resistance (a valve—not shown) is placed in line 64. A fluid restriction, such as orifice 70 (passive resistance) or an active resistance (a valve—not shown) is placed in line 66.

The result is a pressure and flow compensated hydraulic system 10 wherein a single variable displacement pump 24 provides both charge flow to line 36 and low pressure lubrication flow to transmission lube circuit 12, without a dedicated fixed displacement transmission lube pump.

This hydraulic system 10 manages the flow of charge oil to the main pump 20 and the flow of lubrication oil to the transmission lube circuit 12 using the variable displacement charge/lubrication pump 24. Oil flow to the transmission lubrication circuit 12 can be controlled passively by means of the lubrication network resistances (not shown) or actively via the flow control or restriction or orifice 70. The orifice 70 limits the amount of oil that enters into the transmission lubrication circuit 12 and maintains a required minimum pressure at the inlet 34 of the piston pump 20. The variable displacement charge pump 24 changes displacements for transmission lubrication based on the pressure signal from line 36 which is influenced by the lubrication orifices (not shown) in the transmission lube circuit 12 or by a change in oil demand from the variable displacement piston pump 20. When transmission lubrication and charge oil demand is low, the charge pump 24 can decrease pump displacement saving the energy that the other circuits use to move the excess oil produced by the fixed displacement pumps.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A vehicle hydraulic system comprising:
   a transmission lube circuit;
   a main pump;
   a variable displacement charge pump for supplying charge fluid to the main pump, the charge pump having an outlet and having a pressure responsive displacement control unit;
   a charge line communicating the variable displacement charge pump outlet with an inlet of the main pump;
   a sensing line connecting and communicating the charge line with the pressure responsive displacement control unit;
   a lube line connecting and communicating the charge pump outlet with the lube circuit; and
   a fluid restriction in the lube line, wherein the fluid restriction limits the amount of fluid into the transmission lube circuit and maintains a pressure at the inlet of the main pump.

2. The vehicle hydraulic system of claim 1, wherein: the main pump is a variable displacement pump.

3. The vehicle hydraulic system of claim 1, further comprising:
   a transmission pump having an inlet connected to the charge line and having an outlet connected to a transmission control circuit.

4. The vehicle hydraulic system of claim 3, wherein: the transmission pump is a fixed displacement pump.

5. The vehicle hydraulic system of claim 1, further comprising:
   a hydraulic oil filter connected between the outlet of the variable displacement charge pump and the charge line; and
   a filter bypass valve connected between the outlet of the charge pump and the charge line.

6. The vehicle hydraulic system of claim 1, further comprising:
   a brake valve reservoir supply line connected between the charge line and a brake valve; and
   a further fluid restriction in the brake line.

7. The vehicle hydraulic system of claim 1, wherein the vehicle hydraulic system is without a dedicated fixed displacement transmission lube pump.

8. The vehicle hydraulic system of claim 1, wherein the variable displacement charge pump supplies lube fluid to the transmission lube circuit.

9. The vehicle hydraulic system of claim 1, wherein the fluid restriction maintains a required minimum pressure at the inlet of the main pump.

10. A vehicle hydraulic system comprising:
    a transmission lube circuit;
    a variable displacement main pump having an inlet;
    a variable displacement charge pump for supplying charge fluid to the main pump inlet, the variable displacement charge pump having an outlet and having a pressure responsive displacement control unit;
    a charge line communicating the variable displacement charge pump outlet with the main pump inlet;
    a sensing line connecting and communicating the charge line with the pressure responsive displacement control unit;
    a lube line connecting and communicating the charge pump outlet with the lube circuit;
    a fluid restriction in the lube line, wherein the fluid restriction limits fluid flow to the transmission lube circuit and maintains a pressure at the inlet of the main pump;
    a hydraulic oil filter connected between the outlet of the variable displacement charge pump and the charge line; and
    a filter bypass valve connected between the outlet of the variable displacement charge pump and the charge line.

11. The vehicle hydraulic system of claim 10, further comprising:
    a fixed displacement transmission pump having an inlet connected to the charge line and having an outlet connected to a transmission control circuit.

12. The vehicle hydraulic system of claim 10, wherein the vehicle hydraulic system is without a dedicated fixed displacement transmission lube pump.

13. The vehicle hydraulic system of claim 10, wherein the variable displacement charge pump supplies lube fluid to the transmission lube circuit.

14. The vehicle hydraulic system of claim 10, wherein the fluid restriction maintains a required minimum pressure at the inlet of the main pump.

* * * * *